(12) United States Patent
Valentin et al.

(10) Patent No.: US 7,869,114 B2
(45) Date of Patent: Jan. 11, 2011

(54) ELECTROCHEMICAL SYSTEM COMPRISING AT LEAST ONE PARTIAL MAKING UP ZONE

(75) Inventors: Emmanuel Valentin, Le Plessis Trevisse (FR); Samuel Dubrenat, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 746 days.

(21) Appl. No.: 11/659,087

(22) PCT Filed: Jul. 20, 2005

(86) PCT No.: PCT/FR2005/050596
§ 371 (c)(1),
(2), (4) Date: Oct. 26, 2007

(87) PCT Pub. No.: WO2006/021707
PCT Pub. Date: Mar. 2, 2006

(65) Prior Publication Data
US 2009/0284821 A1    Nov. 19, 2009

(30) Foreign Application Priority Data
Aug. 4, 2004   (FR) .................................. 04 51786

(51) Int. Cl.
G02F 1/153 (2006.01)
G09G 3/38 (2006.01)
H04N 9/16 (2006.01)
(52) U.S. Cl. ........................ 359/273; 345/105; 348/817

(58) Field of Classification Search .......... 359/265–275, 359/277, 245–247, 254, 242; 345/49, 105; 250/70; 348/817; 438/929
See application file for complete search history.

(56) References Cited

U.S. PATENT DOCUMENTS

| 5,657,150 A | 8/1997 | Kallman et al. |
| 5,724,175 A * | 3/1998 | Hichwa et al. .............. 359/265 |
| 5,770,331 A | 6/1998 | Olsen et al. |
| 6,995,892 B2 * | 2/2006 | Fanton et al. ............... 359/265 |
| 2002/0067905 A1 * | 6/2002 | MacPherson et al. ....... 385/140 |
| 2004/0053125 A1 | 3/2004 | Giron et al. |

FOREIGN PATENT DOCUMENTS
FR   2 781 084   1/2000

* cited by examiner

*Primary Examiner*—Scott J Sugarman
*Assistant Examiner*—Dawayne A Pinkney
(74) *Attorney, Agent, or Firm*—Oblon, Spivak, McClelland, Maier & Neustadt, L.L.P.

(57) ABSTRACT

Electrochromic device having at least one carrier substrate (S1) provided with a functional multilayer defining a deposition zone and comprising, in succession:
  a first electroconductive layer (1), (the one closest to the substrate);
  a first electrochemically active layer (2);
  an electrolyte layer (3);
  a second electrochemically active layer (4); and
  a second electroconductive layer (5),
characterized in that the functional multilayer is deactivated, with the exception of the first electrochemically active layer (2), in at least a first, partial margination zone (A) located along at least one edge of said deposition zone.

26 Claims, 2 Drawing Sheets

ELECTROCHEMICAL SYSTEM COMPRISING AT LEAST ONE PARTIAL MAKING UP ZONE

The present invention relates to the field of electrochemical devices comprising at least one electrochemically active layer capable of reversibly and simultaneously inserting ions and electrons, in particular to the field of electrochromic devices. These electrochromic devices are used especially for manufacturing glazing assemblies whose light and/or energy transmission or light and/or energy reflection can be modulated by means of an electric current.

Taking the particular example of electrochromic systems, it will be recalled that these comprise, in a known manner, at least one layer of a material capable of reversibly and simultaneously inserting cations and electrons, the oxidation states of which, corresponding to their inserted and expelled states, have different colors, one of the states generally being transparent.

Many electrochromic systems are constructed on the following "five-layer" model: TC1/EC1/EL/EC2/TC2, in which TC1 and TC2 are electronically conductive materials, EC1 and EC2 are electrochromic materials capable of reversibly and simultaneously inserting cations and electrons, and EL is an electrolyte material that is both an electronic insulator and an ionic conductor. The electronic conductors are connected to an external power supply and by applying a suitable potential difference between the two electronic conductors the color of the system can be changed. Under the effect of the potential difference, the ions are expelled from one electrochromic material and inserted into the other electrochromic material, passing through the electrolyte material. The electrons are extracted from one electrochromic material and enter the other electrochromic material via the electronic conductors and the external power circuit in order to counterbalance the charges and ensure electrical neutrality of the material. The electrochromic system is generally deposited on a support, which may or may not be transparent, and organic or mineral in nature, and called a substrate. In certain cases, two substrates may be used—either each possesses part of the electrochromic system and the complete system is obtained by joining the two substrates together, or one substrate has the entire electrochromic system and the other one is designed to protect the system.

When the electrochromic system is intended to work in transmission, the electroconductive materials are generally transparent oxides, the electronic conduction of which has been increased by doping, such as the materials $Sn:In_2O_3$, $Sb:In_2O_3$, $Al:ZnO$ or $F:SnO_2$. Tin-doped indium oxide ($Sn:In_2O_3$ or ITO) is frequently chosen for its high electronic conductivity properties and its low light absorption. When the system is intended to work in reflection, one of the electroconductive materials may be of metallic type.

One of the electrochromic materials most used and most studied is tungsten oxide, which switches from a blue color to transparent depending on its insertion state. This is a cathodic coloration electrochromic material, that is to say its colored state corresponds to the inserted (or reduced) state and its bleached state corresponds to the expelled (or oxidized) state. During construction of a 5-layer electrochromic system it is common practice to combine it with an anodic coloration electrochromic material, such as nickel oxide or iridium oxide, the coloration mechanism of which is complementary. This results in an enhancement in the light contrast of the system. It has been proposed to use a material that is optically neutral in the oxidization states in question, such as for example cerium oxide. All the abovementioned materials are of inorganic type, but it is also possible to combine organic materials, such as electrically conductive polymers (polyaniline, etc.) or Prussian blue, with inorganic electrochromic materials, or even to use only organic electrochromic materials. The cations are generally small monovalent ions, such as $H^+$ and $Li^+$, but it is also possible to use $Ag^+$ or $K^+$ ions.

The function of the electrolyte materials is to allow a reversible flow of ions from one electrochromic material to the other, while preventing the flow of electrons. Electrolytes that possess a high ionic conductivity and that behave in a passive manner during flow of the ions are generally used. Their nature is adapted to the type of ions used for the electrochromic switching. The electrolytes may take the form of a polymer or a gel, for example a proton conduction polymer or a lithium ion conduction polymer. The electrolyte may also be a mineral layer, especially one based on tantalum oxide.

The choice of materials is guided by their optical properties but also by system cost, availability, processability and durability considerations. The terms "durable" and "durability" are used here in the sense of preserving the light properties of the systems over the entire period of their use.

When all the elements making up electrochromic systems are of inorganic nature, they are referred to as "all-solid-state" systems, such as those described in patent EP-0 867 752. When some of the materials are of inorganic nature and some of the materials are of organic nature, the systems are referred to as hybrid systems, such as those described in European patents EP-0 253 713 and EP 0-670 346, for which the electrolyte is a proton conduction polymer, or those described in patents EP-0 382 623, EP-0 518 754 or EP-0 532 408, for which the electrolyte is a lithium ion conduction polymer.

It is possible to insert an additional material between the electrolyte and at least one of the electrochromic materials, so as to modify the nature of the interface and/or to improve the durability of the system. The added material does not have to fulfill all the conditions usually expected of an electrolyte (for example possessing a lower electrical resistance or being an electrochromic material), the presence of the initial electrolyte guaranteeing that the multilayer or multi-material system thus created will favor the flow of ions, while preventing the flow of electrons. Such an example is available from patent EP-0 867 752 relating to an all-solid-state electrochromic system in which a tungsten oxide layer has been inserted between the iridium oxide (the electrochromic material) and the tantalum oxide (the electrolyte). The same approach may be employed in the case of the hybrid system described in the article by K. S. Ahn et al., Appl. Phys. Lett. 81 (2002), 3930. The electrochromic materials are nickel hydroxide and tungsten oxide, and the electrolyte is a proton conduction solid polymer. An additional tantalum oxide layer has been inserted between each electrochromic material and the electrolyte polymer, since direct contact would degrade the electrochromic materials.

By extension, the multilayer or multi-material system thus created is called an electrolyte, as it does not participate in the ion insertion and expulsion mechanism.

Such systems are described for example in European patents EP-0 338 876, EP-0 408 427, EP-0 575 207 and EP-0 628 849. At the present time, these systems can be put into two categories, depending on the type of electrolyte that they use:

either the electrolyte is in the form of a polymer or gel, for example a proton conduction polymer, such as those described in European patents EP-0 253 713 and EP-0 670 346, or a lithium ion conduction polymer, such as those described in patent EP-0 382 623, EP-0 518 754 and EP-0 532 408;

or the electrolyte is a mineral layer, especially one based on tantalum oxide and/or tungsten oxide, which is an ionic conductor but an electron insulator, the systems then being referred to as "all-solid-state" electrochromic systems.

The present invention relates more specifically to improvements made to electrochromic systems falling within the category of all-solid-state systems, but it is also intended for hybrid systems or even for systems in which all the components are of organic nature.

Whatever the configuration adopted, one constraint of this type of electrochemical system consists in giving it a "memory effect" sufficient for the envisioned application. This term is understood to mean the capacity that the system has for maintaining a given state once the power supply has been interrupted. In the case of an electrochromic glazing assembly, this state is generally its colored state. With no power supply, it tends to revert to its bleached state. The object is obviously for this memory effect to be able to last as long as possible, so that the user, by means of the power supply of the system, can actually control its state in a satisfactory manner. In fact, the aim is for example for the electrochromic glazing assembly to be able to remain in the colored state, with no voltage, for several hours (10 to 20 hours).

In fact, this objective is difficult to achieve since the system must cope with a leakage current from one electroconductive layer to the other, especially around the periphery of the system, which tends to return it to its equilibrium state, that is to say to its bleached state.

A first solution has consisted in accepting the existence of these leakage currents and to resupply the system with electricity when it is in its colored state, in a given periodicity, in order to compensate for said leakage currents.

A second solution has consisted in masking one of the two electroconductive layers, that is to say in depositing the layers so that they are offset on their periphery and thus eliminating/reducing the leakage current from one layer to the other at their respective peripheries. The solution is effective, but it complicates the process for manufacturing the system—in particular, at least one of the two electroconductive layers must be deposited by using a mask on the carrier substrate.

A third solution described in patent applications FR-2 811 778 and FR 2 821 937 uses a mechanical and/or laser cut in the layers in order to define, within the multilayer, various electroconductive and insulating zones.

Although these techniques already provide a solution in terms of improving the memory effect, this is still not sufficient to definitely meet the requirements of automobile manufacturers as expressed in their specifications. There are still short circuits within the cuts and the entire connection system of the glazing assemblies.

The object of the invention is therefore to remedy these drawbacks by proposing in particular a novel method of treating the electrochemical devices described above so as to improve their performance, most particularly so as to limit/eliminate the risk of short circuits and leakage currents, and consequently to increase their "memory effect", while simplifying the manner in which this method is carried out.

A subject of the invention is firstly a method of treating an electrochemical device having at least one carrier substrate provided with a functional multilayer comprising at least one electrochemically active layer capable of reversibly and simultaneously inserting ions and electrons, this electrochemical active layer being placed between two electroconductive layers. In particular, this is an electrochemical device of the electrochromic type, with a functional multilayer that includes, at least, in succession:

a first electroconductive layer, a first electrochemically active layer capable of reversibly inserting ions, such as cations like $H^+$ and $Li^+$, or anions like $OH^-$, especially made of an anodic (or respectively cathodic) electrochromic material, an electrolyte layer, a second electrochemically active layer capable of reversibly inserting said ions, especially made of a cathodic (or respectively anodic) electrochromic material, and a second electroconductive layer.

The method of the invention is characterized in that the functionality of at least one of the functional layers, with the exception of one of the electroconductive layers and of one of the electrochemically active layers, especially with the exception of the first electroconductive layer (the one closest to the carrier substrate) and of the first electrochemically active layer (the one associated with said first electroconductive layer), is locally inhibited in a first, partial margination zone (A) and the functionality of all the functional layers is locally inhibited, in a second, total margination zone (B) close to the first, partial margination zone (A), over the entire thickness of the multilayer, said second, total margination zone (B) exposing at least one surface portion of said carrier substrate.

In other preferred embodiments of the invention, one or more of the following arrangements may optionally also be employed:

the functionality of the first electroconductive layer is locally inhibited so as to define, all around said multilayer, a peripheral third, total margination zone devoid of layers, said third, total margination zone exposing at least one surface portion of said carrier substrate;

the functionality of the first electroconductive layer is locally inhibited in such a way that the third, total margination zone is located on the periphery of the first, partial margination zone and/or of the second, total margination zone;

the functionality of at least one of the layers of the multilayer is locally inhibited by being degraded over its (their) thickness by a heat treatment or by laser irradiation or by mechanical abrasion;

the treatment is carried out once the substrate has been provided with all of the functional layers of the multilayer coating; and the electrical functionality of the last electroconductive layer (the one furthest from the carrier substrate) is locally isolated by an insulating band being deposited over at least one surface portion of said multilayer, said surface portion being approximately positioned above the first, partial margination zone and/or the second, total margination zone.

Another subject of the invention is the application of the treatment method described above for the purpose of reducing/eliminating the peripheral short circuits in the functional multilayer when in operation so as to improve the memory effect of said multilayer.

Yet another subject of the invention is an electrochemical device of the electrochromic type treated using the method according to one of the above characteristics, comprising at least one carrier substrate provided with a functional multilayer defining a deposition zone and comprising, in succession:

a first electroconductive layer (the one closest to the substrate);

a first electrochemically active layer capable of reversibly inserting ions, such as cations like $H^+$ and $Li^+$, or anions like OH⁻, especially made of an anodic (or respectively cathodic) electrochromic material;

an electrolyte layer;

a second electrochemically active layer capable of reversibly inserting said ions, especially made of a cathodic (or respectively anodic) electrochromic material; and a second electroconductive layer, said device being characterized in that the functional multilayer is deactivated, with the exception of the first electrochemically active layer, in at least a first, partial margination zone located along at least one edge of said deposition zone.

In other preferred embodiments of the invention, one and/or more of the following arrangements may optionally be also:

the functional multilayer is deactivated, with the exception of the first electrochemically active layer, on the periphery of said deposition zone and respectively along each of the edges of said deposition zone;

the functional multilayer is deactivated over at least part of its periphery, in at least a second, total margination zone located along at least one edge of said deposition zone;

the deactivated first, partial margination zone is close to the second, total margination zone, the second, total margination zone being positioned to the outside of the first, partial margination zone;

the first electroconductive layer is deactivated on its periphery in a third, total margination zone located near the edge of the carrier substrate;

the electrochemical device includes first and second current leads for electrical connection to the first electroconductive layer;

the first and second current leads are located respectively along two contiguous edges of the carrier substrate;

the first or second current leads are electrically connected via an array of conductive wires/strips, these optionally being corrugated, said array also being electrically connected to the second electroconductive layer (the one furthest from the substrate);

the conducting array comprises a plurality of essentially metal wires placed on the surface of a sheet of polymer, especially of the thermoplastic type;

the wires/strips are placed essentially parallel to one another, preferably in an orientation essentially parallel to the length or the width of the second electroconductive layer, at least one of the ends of said wires/strips extending beyond that zone of the substrate which is covered by said second electroconductive layer on at least one of its opposed edges, especially by at least 0.5 mm;

the end of the wires/strips lying in the first, partial margination zone and/or the second, total margination zone is electrically isolated from contact with the active zone of the first electroconductive layer, especially by interposing one or more bands of insulating material, said bands being interposed between the second electroconductive layer and said end of the wires/strips;

at least one of the current leads is in the form of a shim, especially a metal strip, or in the form of one or more conducting wires or in the form of a discrete lead made of conductive material;

at least one of the current leads is made from an electrically conductive enamel placed between a surface portion of the carrier substrate and the first electroconductive layer;

the current lead has, on the surface, a plurality of grooves positioned approximately transverse to a principal axis of said current lead so as to define channels;

the electroactive multilayer covers a deposition zone of the carrier substrate, which zone is a polygon, a rectangle, a rhombus, a trapezoid, a square, a circle, a semicircle, an oval or any parallelogram;

it is an electrochromic system, especially of the "all-solid-state" type, a viologen-based system, a liquid-crystal system, an optical-valve system or a photovoltaic system;

it is an "all-solid-state" electrochromic glazing assembly, especially with a laminated structure;

the electrochromic glazing assembly comprises at least one bulk-tinted glass pane and/or at least one curved glass pane and/or a toughened glass pane;

it also includes at least one of the following coatings: an infrared reflective coating, a hydrophilic coating, a hydrophobic coating, a photocatalytic coating with antisoiling properties, an antireflection coating, an electromagnetic shielding coating; and the carrier substrate is rigid, semirigid or flexible.

Further details and advantageous features of the invention will become apparent from the description given below with reference to the appended drawings, which represent:

In the appended drawings, certain elements have been shown on a larger or smaller scale than in reality, so as to make it easier to understand the figure.

Figure 2:
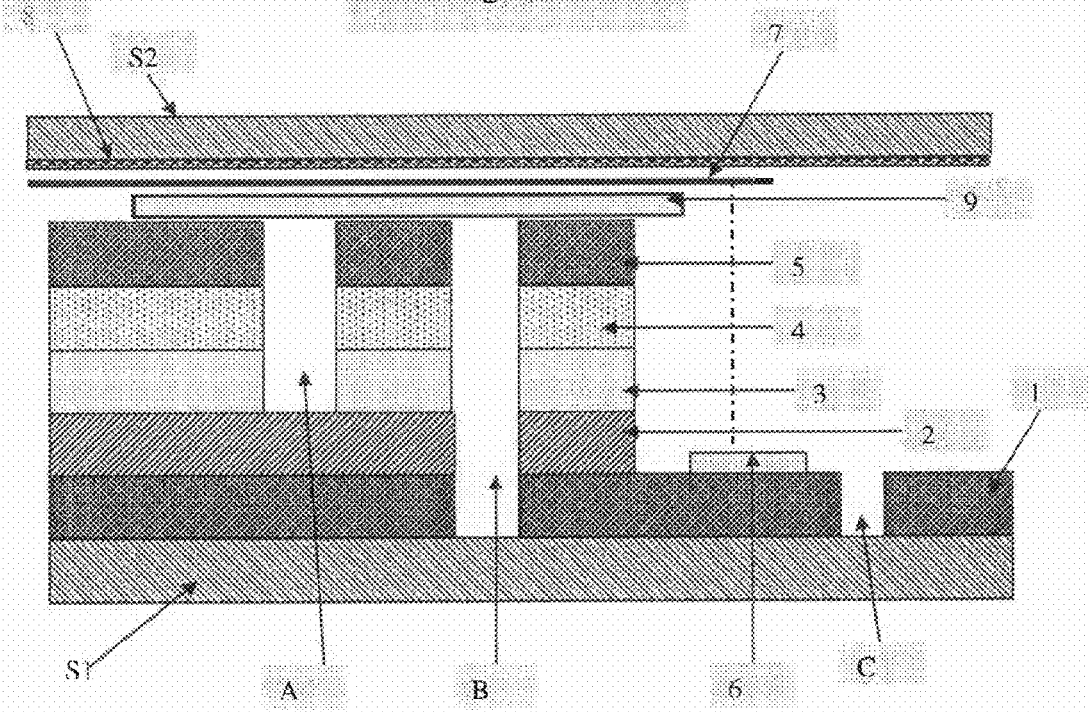
FIG. 2 is a sectional view on I-I of FIG. 1.
Figure 3:
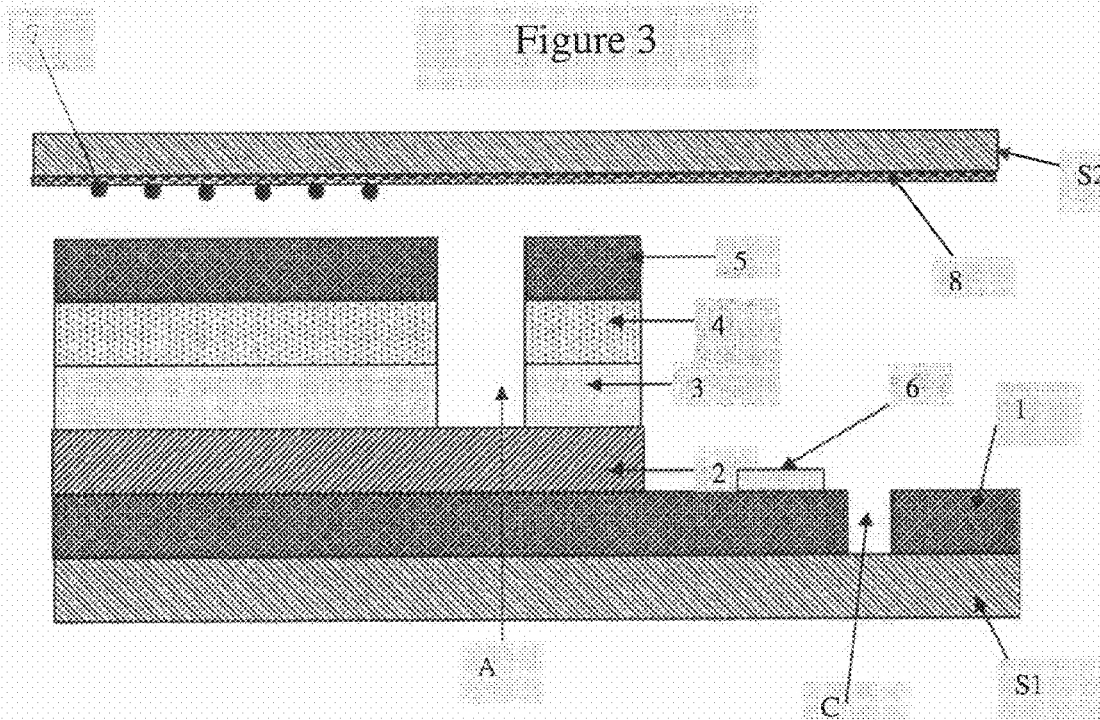
FIG. 3 is a sectional view on II-II of FIG. 1.

The example illustrated by FIGS. 2 and 3 relates to an electrochemical system 1 according to the invention, which can be integrated into an automobile roof. It comprises, in succession from the inside of the passenger compartment outward, two glass panes S1, S2 which are made of clear (but possibly also tinted) silica-soda-lime glass with thicknesses for example of 2.1 mm and 2.1 mm respectively.

The glass panes S1 and S2 are of the same size and of rectangular general shape.

The glass S1 shown in FIGS. 2 and 3 is coated with a thin-film multilayer of the all-solid-state electrochromic type.

The glass S1 is laminated to the glass S2 by a thermoplastic sheet 8 of polyurethane (PU) 0.8 mm in thickness (it may be replaced with a sheet of ethylene-vinyl acetate) (EVA) or polyvinyl butyral (PVB)).

The "all-solid-state" electrochromic thin-film multilayer comprises an active multilayer placed between two electronically conductive materials, also called current collectors, 1 and 5. The collector 1 intended to be in contact with the substrate S1 constitutes the first electroconductive layer (the one closest to the carrier substrate) of the functional multilayer, whereas the collector 5 constitutes the second electroconductive layer (the one furthest from the carrier substrate) of the functional multilayer.

The collectors 1 and 5 and the active multilayer may have substantially the same dimensions and shapes, or substantially different dimensions and shapes, and therefore it will be understood that the path of the collectors 1 and 5 will be adapted according to the configuration. Moreover, the dimensions of the substrates, particularly S1, may be essentially greater than those of the collectors 1, 5 and of the active system.

The collectors 1 and 5 are of the metallic type or the TCO (Transparent Conductive Oxide) type made of ITO, $F:SnO_2$, $Al:ZnO$ or a multilayer of the TCO/metal/TCO type, this metal being chosen in particular from silver, gold, platinum and copper.

It may also be a multilayer of the NiCr/metal/NiCr type, the metal again being chosen in particular from silver, gold, platinum and copper.

Depending on the configuration, they may be omitted and, in this case, current leads are directly in contact with the active multilayer.

The glazing assembly incorporates current leads 6 that allow the active system to be operated via a power supply. These current leads are of the type of those used for heated windows (namely based on a shim, wires or the like).

A preferred way of producing the collector 1 consists in depositing, on the internal face of the carrier substrate S1, a 50-nm SiOC first layer surmounted by a 400-nm F:SnO$_2$ second layer (both layers preferably being deposited in succession by CVD on the float glass before cutting).

A second way of producing the collector 1 consists in depositing, on the carrier substrate S1, a bilayer consisting of an approximately 20-nm SiO$_2$-based first layer, which may or may not be doped (especially doped with aluminum or borium), surmounted by an approximately 100- to 600-nm ITO second layer (both layers preferably being deposited in succession, under vacuum, by magnetron reactive sputtering in the presence of oxygen, possibly carried out hot).

Yet another way of producing the collector 1 consists in depositing, on the carrier substrate S1, an approximately 100- to 600-nm ITO monolayer (this layer preferably being deposited, under vacuum, by magnetron reactive sputtering in the presence of oxygen and carried out hot).

The collector 5 is a 100- to 500-nm ITO layer also deposited by magnetron reactive sputtering on the active multilayer, optionally carried out hot.

The active multilayer shown in FIGS. 2 and 3 is made up as follows:

a 40- to 100-nm layer 2 of anodic electrochromic material made of hydrated iridium oxide, possibly alloyed with other metals, this layer of electrochromic material constituting a first electrochemically active layer capable of reversibly and simultaneously inserting ions and electrons (as a variant, not shown in the figures, the layer of anodic material is based on a 40- to 300-nm layer of hydrated nickel oxide);

a 100-nm layer 3 of hydrated tantalum oxide or hydrated silica oxide or hydrated zirconium oxide, or a mixture of these oxides;

optionally, a 100-nm layer of tungsten oxide is inserted between the layer 2 and the layer 3 (this tungsten layer not being shown in FIGS. 2 and 3);

a layer 4 of cathodic electrochromic material based on hydrated tungsten oxide 200 to 500 nm, preferably 300 to 400 nm and especially about 370 nm in thickness, this layer of electrochromic material constituting a second electrochemically active layer capable of reversibly and simultaneously inserting ions and electrons.

Figure 1:
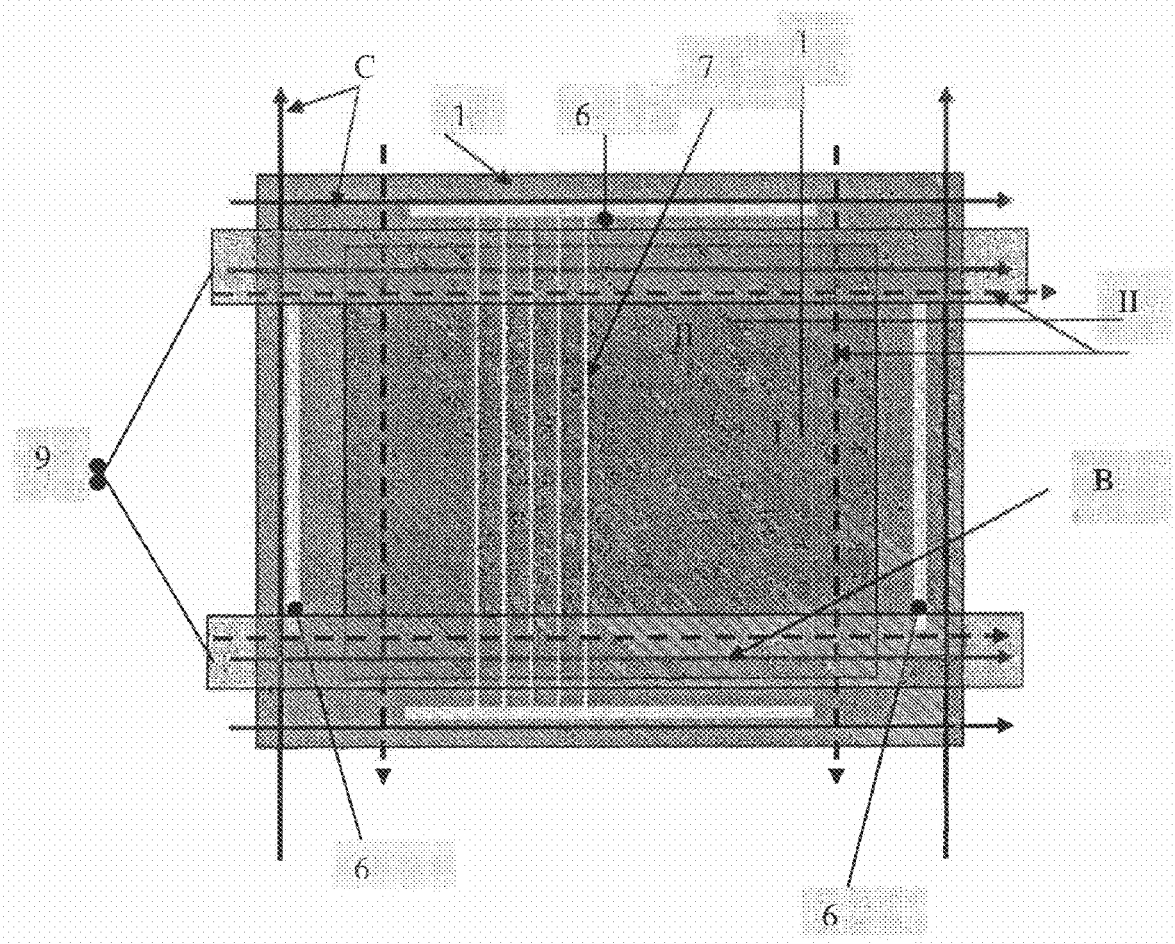
FIG. 1 is a top view of an electrochromic system according to the invention.

The glazing assembly shown in FIGS. 1, 2 and 3 also incorporates (not shown in the figures) a first peripheral seal in contact with the faces 2 and 3, this first seal being designed to form a barrier to external chemical attack.

A second peripheral seal is in contact with the edge of S1, the edge of S2 and the external face (the one turned toward the outside) so as: to form a barrier; to provide a means of mounting the system in the vehicle; to provide sealing between the inside and the outside; to fulfill an esthetic function; and to provide a means of incorporating reinforcements.

The active multilayer is then marginated (so as to inhibit the functionality of at least one electrically active and/or electrochemically active layer of the functional multilayer) over all or part of its periphery with grooves produced by mechanical means or by thermal means, especially by depositing them by laser radiation, optionally pulsed laser radiation, in order to limit the peripheral electrical leakage.

The active multilayer is thus deactivated, with the exception of the first electrochemically active layer (that which was deposited on the first electroconductive layer—the one closest to the carrier substrate) over at least part of its periphery, in at least a first margination zone located along at least one edge of the zone in which the functional multilayer was deposited. This first margination zone A is called a "partial" zone on account of the fact that some of the layers of the multilayer have not been destroyed (over their thickness), namely in this case the first electroconductive layer 1 and the first electrochemically active layer 2.

The functionality of at least one of the layers is therefore locally inhibited by being marginated over its (their) thickness along a closed line, making it possible to delimit the inactive zone of the multilayer between said closed line and the edge/end face of the multilayer (considering that all the layers or most of them have similar dimensions and/or are exactly superposed one on top of another). In fact, the first electroconductive layer is usually slightly larger in size than all the others in order to make its electrical connection to the second layer easier, thereby making it possible to place the necessary connection elements, commonly called current leads 6, on the "overhanging" surface of the multilayer.

This partial margination A thus makes it possible to obtain a groove that will inhibit the circuit as explained above and will leave the periphery of the device functionally inactive.

Preferably, each of the sides of the multilayer is partially marginated along a closed line that has, in smaller proportions, a profile similar or identical to that of the edge of the multilayer (or of the edge of the first layer that undergoes the margination, if the subjacent layers are of slightly different dimensions, especially the first layer as mentioned above). An inactive border that "follows" the perimeter of the device and can easily be camouflaged is thus produced.

The partial margination A is carried out by any mechanical means, especially a cutting means, or advantageously by laser irradiation. One method of implementation consists in leaving the device stationary during the treatment and in mounting the mechanical means/laser emitter on a moving device; another method of implementation consists in doing the opposite.

Other means may be used to marginate by abrasion. Thus, it is possible to use a device that emits a jet of pressurized liquid or gas (nitrogen, air) or a device that emits abrasive particles (glass or carborundum beads, shot, solid CO$_2$ balls, etc.).

This margination operation may be carried out by a laser beam; it may be beneficial to choose a colored state in order to increase the absorption of the laser by the multilayer at the wavelength used.

This active functional multilayer possesses at least a second margination zone B in which the functionality has been deactivated. This second margination zone B is called a total margination zone as the functionality of all the layers of the multilayer, including the functionality of the first electroconductive layer 1 (the one closest to the carrier substrate), will be inhibited.

The functionality of all the layers of the multilayer are therefore locally inhibited, in a manner similar to the first margination zone A, by being degraded through their thicknesses and around their peripheries, especially by suitable mechanical treatment or by suitable laser irradiation.

This second, total margination zone B is positioned set back and toward the outside relative to the partial or selective first margination.

Within the context of the invention, and as is apparent in the figures, the partial margination zones A delimit, starting from the center and moving out toward the peripheral edges of the multilayer, in this non-limiting example, four first zones, each one being substantially parallel to one edge of the multilayer, and then, set back from these first zones and further to the outside, total margination zones B (which are 2 in number in the figures) appear.

The total margination zones B are substantially parallel to two partial margination zones A and, according to a first embodiment, these two partial margination zones A are always separate from the total margination zones B.

According to a second embodiment, these two partial margination zones A touch the total margination zones B at discrete points without, however, a total margination zone B overlapping a partial margination zone A and without contacting an inwardly directed surface portion of the multilayer.

In the example shown, there are two total margination zones B positioned respectively along two parallel opposed edges of the active multilayer. Of course, depending on the configuration envisioned, it is possible to devise substrates comprising more than two total margination zones B placed along adjacent edges (or not), or even configurations having only a single total margination zone B.

As is apparent from FIG. 1, 2 or 3, the carrier substrate S1 includes a third margination zone C. This third margination zone C is called a total margination zone. However, it differs from the second, total margination zones B by the fact that what is inhibited is not the layers over the entire thickness of the active multilayer, but simply the functionality of the first electroconductive layer 1 (the one closest to the carrier substrate) so as to expose, in the third, total, margination zone C, at least one surface portion of the carrier substrate.

The inhibition will therefore be carried out in a similar manner to the first, partial margination zone A and/or to the second, total margination zone B by suitable mechanical treatment or suitable laser irradiation.

This third, total margination zone C is positioned set back from the zone intended for depositing the multilayer and closest to the edges/end faces of the carrier substrate. As may be seen in FIG. 1, this third, total margination zone C is in particular located set back relative to the current leads of the upper and lower electroconductive layers.

It has been found that irradiation with laser light employed in a preferred manner results in truly localized ablation. The precision and effectiveness of the laser make it very advantageous—it then suffices to modulate its operating parameters.

As may be seen in the figures, the active multilayer includes a second electroconductive layer 5 (the one furthest from the carrier substrate), which constitutes the upper electrode and is associated with an array 7 of electrically conducting wires or strips. As was seen previously, the upper conductive layer 5 generally has the same dimensions as the active multilayer and is deposited on the same deposition (sputtering line). It generally consists of layers of doped oxide of the ITO or Al-doped ZnO type, or a layer of metal of the silver type possibly combined with one or more protective layers, these also possibly being conductive (Ni, Cr, NiCr, etc.) and with one or more protective layers and/or layers having an optical role, made of dielectric material (oxide, nitride, fluoride).

Using this type of additional conducting array 7, the current leads are transferred away from the surface covered by the upper conductive layer, electrically connecting them not to this layer but to the ends of these wires or strips, which are configured so as to project beyond the surface of the conductive layer. In its preferred embodiment, the conducting array 7 comprises a plurality of metal wires placed on the surface of a sheet of polymer 8 of the thermoplastic type. This sheet with the wires encrusted in its surface may be affixed to the upper conductive layer in order to ensure their physical contact and electrical connection. The thermoplastic sheet may also serve for laminating the first carrier substrate, of the glass pane type, to another glass pane. The wires/strips are arranged parallel to one another (they may be straight or corrugated), preferably in an orientation essentially parallel to the length or to the width of the upper conductive layer (as a variant, the conducting wires or strips may also intersect). The ends of these wires extend beyond that zone of the substrate which is covered by the upper conductive layer on at least one of its sides, especially by at least 0.5 mm, for example 3 to 10 mm. They may be made of copper, tungsten, graphite-coated tungsten or an iron-based alloy of the nickel-iron type.

It is judicious to prevent the ends of these wires from coming into electrical contact with the zones in the vicinity of which the total margination zones B and/or partial margination zones A have been made (in order to avoid any risk of a short circuit with the end faces of the active multilayer). For this purpose, the ends of the wires may be electrically isolated from these zones by interposing one or more bands 9 of insulating material, for example based on a polymer, optionally an adhesive polymer, of the adhesive tape type.

The present patent application now describes various types of current leads 6 and their arrangements in the system. As regards the upper electrode, according to one embodiment, the ends of the wires/strips of the abovementioned conducting array may be electrically connected to two current strips in the form of flexible strips of insulating polymer coated on one of their faces with conductive coatings. This type of lead is sometimes called an FPC (Flexible Printed Circuit) or FLC (Flat Laminated Cable) and has already been used in various electrical/electronic systems. Its flexibility, the various alternative configurations that it can adopt and the fact that the current lead is electrically insulated on one of its faces make its use very attractive in the present case.

According to another embodiment, the ends of these wires are in electrical contact with two deactivated zones of the lower conductive layer, and these two deactivated zones are electrically connected to the current leads intended for the upper electrode. Conveniently, these may be conducting "clips" that grip the carrier substrate in the aforementioned zones. This is a novel solution that uses the lower electrode to make the electrical connection with the upper electrode.

As regards the current leads of the lower electrode, the latter may be electrically connected along two of its opposed edges in active zones that are not covered by the active multilayer. These leads may be the abovementioned clips.

It is also possible to connect the current leads for the lower and upper electrodes in the form of the abovementioned flexible strips. Thus, there may be two substantially identical strips, each having a support made of a flexible and electrically insulating polymer approximately in the form of an L (of course, there may be many other conceivable configurations depending on the geometrical shape of the carrier substrate and of the layers with which it is provided). On one of the sides of this L there is a conductive coating on one face. On the other side of the L there is a conductive coating on the face opposite the previous one. This overall system of current leads also consists of two of these Ls on a plastic support. When combined, they provide two conducting strips on one face in the case of one of the electrodes and two conducting strips on their opposite face, in the case of the other electrode. This is a compact and easily applied system. Near the junction between the two edges of each L there is an electrical connector, electrically connected to the conductive coatings of the leads.

The system may also be made more compact by replacing these two Ls with a complete frame. In this case, a strip of insulating polymer, approximately rectangular in shape, with a conductive coating on one face along two of its opposed edges and on the other face along its other two opposed edges is used. There is then preferably only a single external electrical connection, instead of two. The frame may be one piece, or several parts that are joined together when mounting the system.

The current leads for the lower and/or upper electrodes may also be in the form of conventional shims, for example in the form of metal bands of the optionally tinned copper type.

The current leads for the lower and/or upper electrodes may also be in the form of a conducting wire (or several assembled conducting wires). These wires may be made of copper, tungsten or graphite-coated tungsten and may be similar to those used for forming the abovementioned conducting array. They may have a diameter ranging from 10 to 600 μm. This is because such a type of wire is sufficient for electrically supplying the electrodes in a satisfactory manner, said wires being remarkably discreet—it may become unnecessary to mask them when mounting the device.

The current-lead configuration is highly adaptable. Substantially rectangular active systems have been described in more detail above, but they may have many different geometrical shapes, in particular those that follow the geometrical shape of their carrier substrate, namely a circle, square, semicircle, oval, any polygon, rhombus, trapezoid, square or any parallelogram, etc. In these various configurations, the current leads are no longer necessarily, for each electrode to be powered, "pairs" of facing current leads. For example, they may be current leads that go right around the conductive layer (or at the very least run along a good part of its perimeter). This is easily achievable when the current lead is a single conducting wire. They may even be discrete current leads, especially when the device is small.

The device according to the invention may use one or more bulk-tinted glass substrates. Advantageously, if the device is a laminated glazing assembly, the bulk-tinted glass is the pane intended to face the interior of the room or passenger compartment, the outer pane being clear. The tinted glass allows the level of light transmission of the glazing assembly to be regulated. When placed on the inside, it limits heat-up of the assembly by absorption. The glass pane or panes may also be curved—this is in particular the case in applications as electrochromic automobile roofs. If the substrates are made of glass, they may be made of clear or dark glass, they may be flat or curved in shape and they may be reinforced by chemical or thermal toughening, or simply hardened. Their thickness may vary between 1 mm and 15 mm, depending on the expectations and requirements of the final users. The substrates may be partially coated with an opaque material, in particular around their periphery, particularly for esthetic reasons. The substrates may also possess an intrinsic functionality (coming from a multilayer consisting of at least one layer of the solar-control, antireflection, low-emissivity, hydrophobic, hydrophilic or other type) and in this case the electrochromic glazing assembly combines the functions provided by each element so as to meet the requirements of users.

The polymer insert is used here for the purpose of joining the two substrates together by the lamination procedure widely used in the automobile or building fields, so as to end up with a security product: bulletproof or anti-enjection security, for use in the transport field, and anti-theft security (shatterproof glass) for use in the building field. The lamination operation is also favorable in the sense that it isolates the functional multilayer from chemical or mechanical attack. The interlayer is preferably chosen to be based on ethylene/vinyl acetate (EVA) or on its copolymers, and it may also be a polyethylene (PU), a polyvinyl butyral (PVB), or a one-component or multicomponent resin that can be heat-cured (epoxy or PU) or UV-cured (epoxy or acrylic resin). The lamination insert is generally transparent, but it may be completely or partly colored in order to meet the wishes of users.

The isolation of the multilayer from the outside is generally completed by systems of seals placed along the end faces of the substrates, or indeed partly inside the substrates.

The lamination insert may also include additional functions, such as a solar-protection function provided for example by a plastic film comprising ITO/metal/ITO multilayers or a film composed of an organic multilayer.

The layers of the active system are preferably deposited by a vacuum technique, of the sputtering type, possibly magnetically enhanced sputtering, by thermal evaporation or electron beam evaporation, by laser ablation, by CVD (chemical vapor deposition), optionally plasma-enhanced or microwave-enhanced CVD.

In fact, it is particularly advantageous here to use a vacuum deposition technique, especially of the sputtering type, as this allows the characteristics of the constituent layers of the active multilayer (deposition rate, density, structure, etc.) to be very finely controlled.

To demonstrate the improvement in the memory effect of the electrochemical system incorporating all of the characteristics of the invention (the improvement in memory effect being expressed by the increase in light transmission $T_L$ in %), the results of tests carried out on specimens according to the invention are given below.

On the basis of an electrochemical cell incorporating four partial marginations that are not optimized according to the methods of the invention, an increase in $T_L$ of around 7 to 10%/h was noted.

In this same cell incorporating four partial marginations, the increase in $T_L$ was around 0.5%/h.

In this same cell incorporating two faces with partial margination and two faces with total margination (with, however, no set-back partial margination), the increase in $T_L$ was around 4 to 5%/h.

In this cell incorporating two faces with partial margination and two faces with simultaneously total margination and set-back partial margination, the increase in $T_L$ was around 0.5%/h.

The connection system was then incorporated into this cell.

It was noted that the absence of insulating strips between the wires and the margination zones on the upper electrode causes an increase in $T_L$ of 5 to 6%/h, and poor total margination around the periphery of the cell (the third margination zone) causes an increase in $T_L$ of 10 to 12%/h.

In contrast, an electrochromic glazing assembly incorporating together all the provisions of the invention sees $T_L$ increase from 34%/h to 1 to 2%/h.

This glazing assembly may be used as windows for buildings, windows for automobiles, windows for commercial vehicles or air, sea and rail mass-transit vehicles, driving mirrors, or other mirrors.

The invention claimed is:

1. A method of treating an electrochemical device having at least one carrier substrate (S1) provided with a functional multilayer comprising at least, in succession:

a first electroconductive layer (1), a first electrochemically active layer (2) capable of reversibly inserting $H^+$ and Li⁺ cations, or OH⁻ anions, made of an anodic, or respectively cathodic, electrochromic material, an electrolyte layer (3), a second electrochemically active layer (4) capable of reversibly inserting said ions-made of a cathodic, or respectively anodic, electrochromic material, and a second electroconductive layer (5), the method comprising locally inhibiting the functionality of at least one of the functional layers in a first, partial margination zone (A), with the exception of one of the electroconductive layers and of one of the electrochemically active layers, with the exception of the first electroconductive layer (1) which is the one closest to the carrier substrate, and of the first electrochemically active layer (2) which is the one associated with said first electroconductive layer, and locally inhibiting the functionality of all the functional layers in a second, total margination zone (B) close to the first, partial margination zone (A), over the entire thickness of the multilayer, said second, total margination zone (B) exposing at least one surface portion of said carrier substrate.

2. The method as claimed in claim 1, comprising locally inhibiting that the functionality of the first electroconductive layer (1) to define, all around said multilayer, a peripheral third, total margination zone (C) devoid of layers, said third, total margination zone exposing at least one surface portion of said carrier substrate.

3. The method as claimed in claim 2, comprising locally inhibiting the functionality of the first electroconductive layer (1) in such a way that the third, total margination zone (C) is located on the periphery of the first, partial margination zone (A) and/or of the second, total margination zone (B).

4. The method as claimed in claim 1, comprising locally inhibiting the functionality of at least one of the layers of the multilayer by being degraded over a thickness of at least one of the layers by a treating with heat, irradiating with a laser, or mechanical abrasion.

5. The method as claimed in claim 4, wherein the treating is carried out once the substrate has been provided with all of the functional layers of the multilayer coating.

6. The method as claimed in claim 1, wherein the electrical functionality of the last electroconductive layer which is the one furthest from the carrier substrate is locally isolated by an insulating band (9) depositing the last electroconductive layer over at least one surface portion of said multilayer, said surface portion being approximately positioned above the first, partial margination zone (A) and/or the second, total margination zone (B).

7. An electrochromic device, comprising at least one carrier substrate (S1) provided with a functional multilayer defining a deposition zone and comprising, in succession:

a first electroconductive layer (1) which is the one closest to the substrate;

a first electrochemically active layer (2) capable of reversibly inserting H⁺ and Li⁺ cations, or OH⁻ anions, made of an anodic, or respectively cathodic, electrochromic material;

an electrolyte layer (3);

a second electrochemically active layer (4) capable of reversibly inserting said ions, made of a cathodic, or respectively anodic, electrochromic material; and a second electroconductive layer (5), characterized in that the functional multilayer is deactivated, with the exception of the first electrochemically active layer (2), in at least a first, partial margination zone (A) located along at least one edge of said deposition zone, wherein the functional multilayer is deactivated over at least part of its periphery, in at least a second, total margination zone (B) located along at least one edge of said deposition zone.

8. The device as claimed in claim 7, wherein the deactivated first, partial margination zone (A) is close to the second, total margination zone (B), the second, total margination zone (B) being positioned to the outside of the first, partial margination zone (A).

9. The device as claimed in claim 8, wherein the first electroconductive layer (1) is deactivated on its periphery, in a third, total margination zone (C) located near the edge of the carrier substrate (S1).

10. The device as claimed in claim 7, wherein the electrochemical device includes first and second current leads (6) for electrical connection to the first electroconductive layer (1).

11. The device as claimed in claim 10, wherein said first and second current leads (6) are located respectively along two contiguous edges of the carrier substrate (S1).

12. The device as claimed in claim 10, wherein said first or second current leads (6) are electrically connected via an array (7) of conducting wires/strips, these optionally being corrugated, said array (7) also being electrically connected to the second electroconductive layer (5) which is the one furthest from the substrate.

13. The device as claimed in claim 12, wherein the conducting array (7) comprises a plurality of essentially metal wires placed on the surface of a sheet of a thermoplastic type polymer.

14. The device as claimed in claim 12, wherein the wires/strips are placed essentially parallel to one another, preferably in an orientation essentially parallel to the length or the width of the second electroconductive layer, at least one of the ends of said wires/strips extending by at least 0.5 mm beyond that zone of the substrate which is covered by said second electroconductive layer on at least one of its opposed edges.

15. The device as claimed in claim 14, wherein the end of the wires/strips lying in the first, partial margination zone (A) and/or the second, total margination zone (B) is electrically isolated from contact with the active zone of the first electroconductive layer (1) by interposing one or more bands (9) of insulating material, said bands (9) being interposed between the second electroconductive layer (5) and said end of the wires/strips.

16. The device as claimed in claim 10, wherein at least one of the current leads (6) is in the form of a shim or a metal strip, or in the form of one or more conducting wires or in the form of a discrete lead made of conductive material.

17. The device as claimed in claim 10, wherein at least one of the current leads (6) is made from an electrically conductive enamel placed between a surface portion of the carrier substrate and the first electroconductive layer.

18. The device as claimed in claim 10, wherein the current lead (6) has, on the surface, a plurality of grooves positioned approximately transverse to a principal axis of said current lead in order to define channels.

19. The device as claimed in claim 7, wherein the electroactive multilayer covers a deposition zone of the carrier substrate, which zone is a polygon, a rectangle, a rhombus, a trapezoid, a square, a circle, a semicircle, an oval or any parallelogram.

20. The device as claimed in claim 10, which is an electrochromic system of the all-solid system, a viologen-based system, a liquid-crystal system, an optical-valve system or a photovoltaic system.

21. The device as claimed in claim 10, which is an all-solid state electrochromic glazing assembly with a laminated structure.

22. The device as claimed in claim 21, wherein said electrochromic glazing assembly comprises at least one bulk-tinted glass pane and/or at least one curved glass pane and/or a toughened glass pane.

23. The device as claimed in claim 21, further comprising at least one of the following coatings: an infrared reflective coating, a hydrophilic coating, a hydrophobic coating, a photocatalytic coating with antisoiling properties, an antireflection coating, and an electromagnetic shielding coating.

24. The device as claimed in claim 7, wherein the carrier substrate is rigid, semirigid or flexible.

25. A window for buildings, a window for automobiles, a window for commercial or rail, sea or air mass-transit vehicles, driving mirrors and other mirrors, comprising the device as claimed in claim 7.

26. A method of reducing/eliminating peripheral short circuits in a functional multilayer in a electrochemical device when in operation to improve the memory effect of said multilayer, the functional multilayer comprising at least, in succession:

a first electroconductive layer (1), a first electrochemically active layer (2) capable of reversibly inserting $H^+$ and $Li^+$ cations, or $OH^-$ anions, made of an anodic, or respectively cathodic, electrochromic material, an electrolyte layer (3), a second electrochemically active layer (4) capable of reversibly inserting said ions-made of a cathodic, or respectively anodic, electrochromic material, and a second electroconductive layer (5), and the method comprising locally inhibiting the functionality of at least one of the functional layers in a first, partial margination zone (A), with the exception of one of the electroconductive layers and of one of the electrochemically active layers, with the exception of the first electroconductive layer (1) which is the one closest to the carrier substrate, and of the first electrochemically active layer (2) which is the one associated with said first electroconductive layer; and locally inhibiting the functionality of all the functional layers in a second, total margination zone (B) close to the first, partial margination zone (A), over the entire thickness of the multilayer, said second, total margination zone (B) exposing at least one surface portion of said carrier substrate to reduce/eliminate peripheral short circuits in the functional multilayer.

* * * * *